Patented Feb. 9, 1943

2,310,605

UNITED STATES PATENT OFFICE 2,310,605

PRODUCTION OF SULPHUR DIOXIDE-OLEFIN RESINS

Maxwell M. Barnett, Port Sulphur, La., assignor to Freeport Sulphur Company, New York, N. Y., a corporation of Delaware No Drawing. Application February 3, 1939, Serial No. 254,381

9 Claims. (Cl. 260—80)

This invention relates to resins of the sulphur dioxide-olefin type and to new and improved processes for producing them.

It has long been known that resinous polymerization products may be produced under proper conditions by the reaction of sulphur dioxide with active unsaturated organic compounds of the olefin type, of which the mono-olefins like ethylene, propylene, butene-1, butene-2, isobutene, pentene-1 and pentene-2 are examples. Other examples of such unsaturated compounds are butadiene, pentadiene and other conjugated diolefins; pentyne-1, hexyne-1 and other acetylenes; and poly-functional unsaturated compounds of the nature of allyl alcohol, vinyl acetate and allyl propionate. This reaction, however, takes place to a substantial extent only under the influence of catalysts. When carried out properly in the presence of a satisfactory catalyst, the reaction produces thermoplastic resins that are valuable for use in the manufacture of molded objects, as bases for lacquers, varnishes, etc., and for other purposes to which plastics are ordinarily applied.

The commercial development of resins of the sulphur dioxide-olefin type has been retarded by the lack of sufficiently active catalysts. Light of the proper wave length, oxidizing compounds such as certain peroxides and silver nitrate, and certain organometallic compounds have been disclosed heretofore as suitable catalytic agents. The known processes involve the reaction of sulphur dioxide and an active unsaturated organic compound, in a sealed glass tube or steel bomb, at comparatively low temperatures and in the presence of sunlight or another of these known catalysts. None of these catalysts, however, is capable of converting the reactants into the desired resinous product in an economically feasible period of time, many hours and even days being required to obtain a satisfactory yield, and in many cases resins are produced which are contaminated or discolored by the catalyst.

One of the objects of my invention is to secure a higher yield of resin in a given period of time than has heretofore been possible in the reaction between sulphur dioxide and unsaturated compounds of the olefin type by providing very active catalysts for the reaction.

Another object of my invention is to provide catalysts for the reaction which result in a high yield of resin within a very short period of time as compared with prior processes, periods of about an hour or less being required in accordance with this invention, instead of hours or days.

A further object of the invention is to provide an improved process for producing resins of the sulphur dioxide-olefin type which are not discolored by the decomposition of the catalyst.

Other objects and advantages of the invention may become apparent from the following description.

According to the present invention, I have found that the production of resinous polymerization products through the reaction between sulphur dioxide and active unsaturated organic compounds, such as the mono-olefins, can be practiced in a commercially feasible manner,— with large yields, a short reaction period and products free from undesirable contamination or discoloration,—by carrying out the reaction in the presence of ozonides, as catalysts. More particularly, I have found that valuable results are obtained when the catalyst is an ozonide that has been prepared under substantially anhydrous conditions. While certain ozonides may fail to produce useful results, for example, in the absence of proper control over the conditions of their preparation, or of their use in their resin-forming process, I have discovered that results far superior to any heretofore realized may be obtained by proper understanding of and control over the preparation and use of ozonides in accordance with the present disclosure.

It is believed that the reaction of olefins with sulphur dioxide is of the type commonly termed a "chain reaction" and yields high molecular weight polymeric substances which may be formulated:

—SO$_2$—R—SO$_2$—R'—SO$_2$—R— where R represents the olefin residue. This type of reaction requires an energizer to cause it to proceed. It is my belief that the ozonides, which are relatively unstable compounds, furnish the energy necessary for activation of the reagents through their own decomposition, which may be brought about by sulphur dioxide, water and various other substances. The outstanding results obtained by carrying out the polymerization reaction in the presence of ozonides prepared under anhydrous conditions may therefore be explained by the postulation that if the ozonide comes into contact with a material that causes its decomposition before it is introduced into the reaction mixture, then the energy release is accomplished and no catalytic effect is obtained.

In carrying out my process for the production of resin, sulphur dioxide is reacted with an active unsaturated organic compound of the olefin type in the presence of an active ozonide catalyst. Among the ozonides which are very effective are the oxonides of the butylenes, that is, butene-1 and btuene-2 ozonides, and iso-butene ozonide. Among those which are moderately effective are the ozonides of cyclo-hexene and alpha pinene. The reaction is usually conducted in a sealed container at comparatively low temperatures.

I have found that when the ozonide catalyst has been prepared in a substantially anhydrous condition, proportions of catalyst to reaction mixture as low as .01%, by weight, may be employed. Increasing amounts of the ozonide are effective in increasing the yield and velocity of the reaction until an optimum quantity is attained, which varies with different ozonides but ordinarily is from about .5 to about 1%, by weight. Further increase in the quantity of the catalyst, beyond about 1%, ordinarily fails to increase either the yield or the velocity of the reaction, so that optimum results may be secured by the use of very small amounts of the catalytic agent. While these proportions have general application to various ozonides, it will be understood that the exact optimum and limiting quantities vary with different ozonides, since the catalytic effects of different compounds in this class are not directly proportional to their weight.

In the preparation of the improved catalysts according to the present invention, ozone may first be produced from air or oxygen, in well-known manner, by passing thoroughly dried air or oxygen through an ozonizer, great care being taken to maintain anhydrous conditions in all of the equipment contacted by the gas. The catalyst is then prepared by passing the ozonized air or oxygen into the unsaturated hydrocarbon or other unsaturated organic compound which is to be converted into the ozonide. Chemical combination takes place, the ozone adding to the C=C linkage of the unsaturated compound.

If the unsaturated organic compound to be ozonized is quite volatile, as in the case of butene-2, it is advisable to use a solvent for it which is inert to ozone, for example, n-pentane, chloroform, methylene chloride, etc., and to cool the mixture into which the ozone is passed to a temperature such that the vapor pressure of the mixture is low enough to prevent substantial losses by evaporation.

The ozone is passed into the unsaturated compound, or the solution thereof, until no further absorption takes place. In this manner substantially pure ozonide or a solution of the same is obtained, depending on the mode of operation. When the ozonide is prepared in the form of a solution, the solvent may be evaporated at a relatively low temperature or under vacuum to obtain the substantially pure ozonide. Again, the operations involved in reacting the ozone with the unsaturated compound and in recovering substantially pure ozonide should be carried out in a manner such as to exclude all substantial amounts of water from the system, and the active ozonide to be used as catalyst for the polymerization reaction should be carefully preserved under anhydrous conditions.

The production of the sulphur dioxide-olefin resin, using an active ozonide as the catalyst, may then be carried out as follows:

The proper quantity of ozonide for catalyzing the reaction, say 0.5% of the weight of resin which theoretically can be obtained from the sulphur dioxide-olefin reaction, may be weighed and dissolved in a small quantity of an alcohol, or a solution of known concentration may be made in an alcohol or other suitable solvent and an aliquot taken. The ozonide or ozonide solution is added to a mixture of sulphur dioxide and olefin in a reaction vessel. If the mixture is at a temperature such that it possesses appreciable vapor pressure, the catalyst should be forced into the vessel with pressure. For most rapid reaction the temperature of the reaction mixture should be above 0° C. After the introduction of ozonide there is an induction period during which no perceptible reaction takes place. This induction period is much shorter according to my process than when using known catalysts and may vary from a few seconds to a few minutes, from 1 to 2 minutes being the usual duration. Once started, the reaction proceeds rapidly and is substantially complete within one hour.

The addition of the ozonide catalyst to the reaction mixture ordinarily takes place in a single operation, the vessel then being sealed. This step, however, may be carried out in other ways, for example, by adding the catalyst in portions as the reaction proceeds.

The following example illustrates a suitable manner of practicing my process:

The ozonide of butene-2 is prepared in active form as described above. A mixture of butene-2 and $SO_2$, in the molar ratio of 1:3, is introduced into a glass vessel cooled with dry ice and ether. A quantity of the ozonide, corresponding to 0.5% of the weight of resin theoretically obtainable, is dissolved in a quantity of ethyl alcohol amounting to 5% of the volume of the reaction mixture and then added to the reactants in the vessel. The vessel is sealed and placed in a bath maintained at 0° to 10° C. This temperature is not critical, but higher yields are obtained if the reacting mixture is not allowed to become too hot. Reaction ordinarily begins 1 to 2 minutes after the vessel is put into the bath and results in substantially 100% conversion of the olefin to polymer in a period of one hour.

Satisfactory yields may be obtained by carrying out the reaction without external cooling of the vessel, that is, with the vessel subject to room temperatures, although optimum yields are obtained under conditions such as mentioned in the foregoing example.

An important feature of my invention consists in the fact that the resinous product resulting from the reaction is free from contaminants affecting its color or clarity. The product obtained from the vessel in which the reaction has taken place, after washing or other treatment to remove excess reagents, is capable of being molded into hard, tough and stable objects that are normally colorless and transparent. It is also valuable as a molding material, with or without added substances such as fillers, dyes and color pigments, as a constituent of lacquers, paints, adhesives and other coating compositions, and as a plastic in various fields in which other known plastic materials are employed.

The process of my invention may be carried out in several ways, and as long as the ozonide is prepared in the anhydrous condition and used in the proper concentration, the specific manner in which it is used can be varied to suit the conditions and characteristics of the various reagents employed. For example, the ozonide catalyst may be prepared in the anhydrous condition by passing gaseous ozone through anhydrous olefin until the ozonide concentration reaches the desired value, such as about 0.5%; after which the proper quantity of liquid sulphur dioxide may be added, and the reaction will proceed as outlined above. This procedure is advantageous in that it eliminates one or more steps in the process, but control over the quantity of active catalytic material is somewhat more difficult than in the exemplary procedure set forth hereinabove.

Although ozonides as a class are superior catalysts for the sulphur dioxide reaction, it should be understood that all ozonides are not of equal catalytic activity and that some, for example, the ozonides of eugenol and isoeugenol, are not of appreciable practical value for this purpose. The activity of any particular ozonide and the degree of its effectiveness in relation to the illustrative compounds mentioned hereinabove may be determined readily by tests.

In the preparation, handling and use of ozonides, however, extreme care should be exercised because of the unstable qualities of this class of compounds. Some of the ozonides, for example, ethylene and acrolein ozonides, are so unstable as to be spontaneously explosive and are sensitive to slight shocks or rises in temperature; the butene ozonides are not spontaneously explosive, but a slight shock or elevation of temperature is sometimes sufficient to cause detonation.

The particular compounds and procedures described in this specification are given in order clearly to set forth preferred manners of practicing my invention. The invention is not restricted to these, but should be accorded a scope commensurate with its contributions to the art as limited only by requirements of the appended claims.

I claim:

1. The process for producing resins of the sulphur dioxide-olefin type which comprises passing ozone into substantially anhydrous olefin until a mixture of olefin and a small proportion of substantially anhydrous ozonide is obtained, and thereafter introducing sulphur dioxide into said mixture to cause the desired polymerization reaction to proceed.

2. The process for producing resin of the sulphur dioxide-olefin type which comprises reacting sulphur dioxide and butene-2 in the presence of substantially anhydrous butene-2 ozonide.

3. The process for producing resins of the sulphur dioxide-olefin type which comprises reacting sulphur dioxide and a compound selected from the group consisting of olefins, pentyne-1, hexyne-1, allyl alcohol, vinyl acetate and allyl propionate in the presence of a substantially anhydrous ozonide of an olefin.

4. The process for producing resins of the sulphur dioxide-olefin type which comprises reacting sulphur dioxide and an olefin in the presence of a substantially anhydrous ozonide of an olefin as catalyst, and cooling the reactants during the course of the reaction.

5. The process for producing resins of the sulphur dioxide-olefin type which comprises reacting sulphur dioxide and an olefin in the presence of a substantially anhydrous ozonide of an olefin that has been prepared under anhydrous conditions, carrying out the reaction in a sealed container, and cooling the container at temperatures between 0° C. and room temperature during the course of the reaction.

6. The process for producing resins of the sulphur dioxide-olefin type which comprises reacting sulphur dioxide and an olefin in the presence of a substantially anhydrous ozonide of an olefin, the reaction mixture initially containing from about .01% to about 1.0% ozonide, by weight.

7. The process for producing resins of the sulphur dioxide-olefin type which comprises introducing a substantially anhydrous ozonide of an olefin into a vessel containing sulphur dioxide and a compound selected from the group consisting of olefin, pentyne-1, hexyne-1, allyl alcohol, vinyl acetate and allyl propionate, sealing the vessel and permitting the resulting polymerization reaction to proceed.

8. As a new product of manufacture, a sulphur dioxide-olefin resin free from catalytic discoloration consisting of the product of the reaction between sulphur dioxide and olefin in the presence of a substantially anhydrous ozonide of an olefin.

9. As a new product of manufacture, sulphur dioxide-butene-2 resin free from catalytic discoloration consisting of the product of the reaction between sulphur dioxide and butene-2 in the presence of substantially anhydrous butene-2 ozonide.

MAXWELL M. BARNETT.